Figure 1:
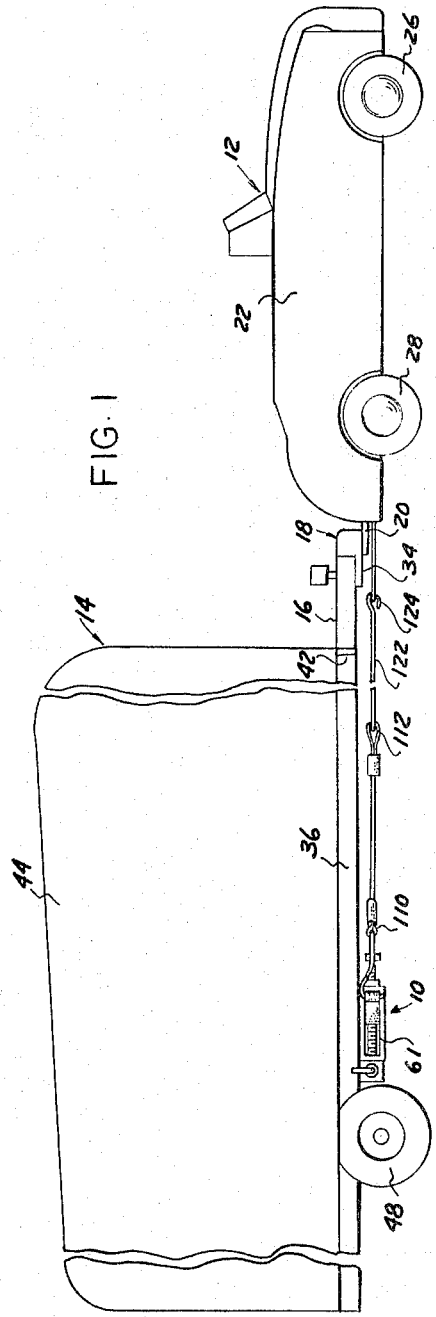

Nov. 8, 1966    M. D. KOONTZ    3,284,097
RESILIENT LOAD ADJUSTER FOR TRACTOR-TRAILER
LOAD DISTRIBUTORS
Filed Sept. 11, 1964

INVENTOR.
MARSHALL D. KOONTZ, DECEASED
DOROTHY G. KOONTZ, ADMINISTRATRIX
BY
*Barthel & Bugbee*
ATTORNEYS

United States Patent Office 3,284,097
Patented Nov. 8, 1966

3,284,097
RESILIENT LOAD ADJUSTER FOR TRACTOR-TRAILER LOAD DISTRIBUTORS
Marshall D. Koontz, deceased, late of Detroit, Mich., by Dorothy G. Koontz, administratrix, 15326 Petoskey Ave., Detroit, Mich.
Filed Sept. 11, 1964, Ser. No. 395,961
9 Claims. (Cl. 280—405)

This invention relates to tractor-trailer vehicle combinations and, in particular, to load distributors for such vehicles.

Hitherto, the operation of tractor-trailer vehicle combinations has been attended with difficulty and danger by reason of the fact that the load of a semi-trailer supported by wheels at its rearward end is heavily concentrated upon the coupling between the vehicles because of the weight of the trailer load pressing down upon it with the semi-trailer wheels acting as a fulcrum and the chassis as a lever applying the load to the coupling. As a consequence, the excessive load pressing downward upon the coupling at the rearward end of the tractor vehicle is transferred to the rear wheels of the tractor vehicle, thereby tending to lift the front wheels thereof off the ground, acting around the rear axle as a fulcrum. This action also decreases the traction of the front wheels on the road, increases the difficulty of steering, and tends to cause so-called "nose-diving" of the tractor vehicle.

This decreased load on the front wheels of the tractor or towing vehicle makes the latter difficult to control as to steering and greatly reduces the effectiveness of the front wheel brakes, leaving the major portion of the braking to be accomplished by the rear wheels of the tractor and by the rear wheels of the semi-trailer. This also causes the excessive wear on the rear tires. Furthermore, if the air pressure differs in the towing vehicle tires, the towing vehicle or tractor tends to weave or whipsaw so as to oscillate in a sidewise direction. This frequently results in causing the coupled vehicles to "jackknife" by the transfer of the sidewise oscillation of the tractor vehicle to the trailer vehicle, at the least creating a traffic hazard and at the most causing a wreck.

In previous Patents Nos. 2,691,533, 2,756,072 and 3,116,074 there have been provided load-distributing arrangements for transferring a greater part of the load to the front wheels of the towing vehicle or tractor so as to prevent or at least greatly reduce the hazards mentioned above. The present invention provides an improved resilient load adjuster for an improved load-distributing arrangement of this character which is of simpler and less expensive construction and more easily adjusted than my previous inventions mentioned above, yet is very strong and simple to install and adjust.

Accordingly, one object of this invention is to provide an improved resilient load adjuster for a stabilized tractor-trailer load distributor which is of simple but strong construction and which is more easily installed than previous load distributors of this type.

Another object is to provide an improved resilient load adjuster of the foregoing character wherein the major part of the mechanism is concentrated in a "package unit" or compact assembly on the chassis of the semi-trailer, and requires only minor additions to the towing vehicle.

Another object is to provide an improved resilient load adjuster of the foregoing character which is especially well adapted to house trailers, boat trailers and the like which are towed by private passenger automobiles, such as pleasure cars, wherein the simplified construction and consequently reduced cost of manufacture results in a low sales price which brings it within the reach of many more automobile and trailer owners than have hitherto been able to afford such devices.

Another object is to provide a resilient load adjuster as set forth in the object immediately preceding wherein the load adjustment is easily made from a position beside the semi-trailer vehicle without requiring adjustments to be made at inconvenient locations in the towing vehicle or necessitating expensive installations of adjusting mechanism in the towing vehicle.

Figure 2:
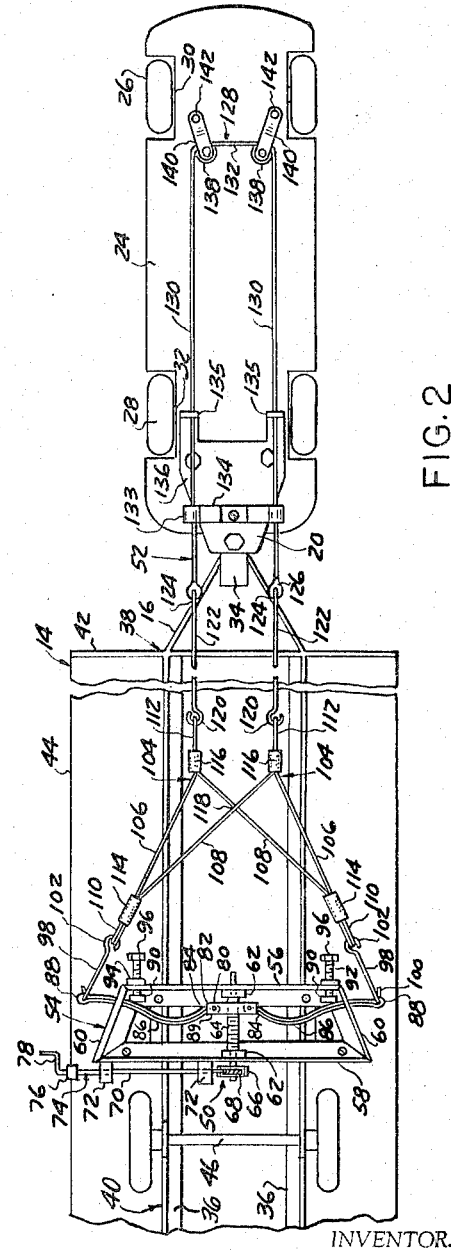

Other objects and advantages of the invention will become apparent during the course of the following description of the accompanying drawing, wherein:

FIGURE 1 is a side elevation of a semi-trailer and towing vehicle equipped with a stabilized load distributor including an improved resilient load adjuster according to one form of the invention, with the rearward end and forward portion of the semi-trailer cut away and shortened to enable the showing of the invention upon a larger scale than would otherwise be possible; and FIGURE 2 is a bottom plan view of the construction shown in FIGURE 1.

Referring to the drawing in detail, FIGURES 1 and 2 show an improved and simplified stabilized tractor-trailer load distributor, generally designated 10, as installed in a conventional towing vehicle or tractor 12, such as a passenger car, and in a conventional towed vehicle or semi-trailer 14, such as a house trailer, the latter having a tongue 16 connected by a conventional coupling 18 to the adapted bracket 20 secured to the towing vehicle 12. The towing vehicle or tractor 12 is shown diagrammatically as a pleasure car having a body 22 mounted on a chassis 24 equipped with front and rear wheels 26 and 28 on front and rear axles 30 and 32 respectively, the springing and suspensions of the front and rear axles 30 and 32 together with the steering mechanism for the front wheels 26 being omitted to simplify the disclosure, since these are conventional and well-known to those skilled in the automotive art. The conventional coupling 18 may consist, for example, of the usual upstanding ball (not shown) on the bracket 20 engaged by a mating socket (also not shown) on the coupling arm 34 extending from the tongue 16 over the bracket 20.

The trailer tongue 16 is connected to the forward ends of the parallel longitudinal channel members 36 of the semi-trailer frame 38 which forms the supporting structure of the semi-trailer chassis, generally designated 40. The frame 38 has cross members 42 (one only being shown) which assist in supporting the semi-trailer body 44. It will be understood that the semi-trailer frame 38 also possesses additional cross members (not shown) which are omitted to simplify the disclosure. Also omitted is the springing by which the axle 46 is connected to the longitudinal members 36 of the semi-trailer frame 38, such springing being also conventional and well known to those skilled in the trailer art. Wheels 48 are mounted, as usual, upon the outer ends of the semi-trailer axle 46.

The stabilized trailer load distributor 10 includes an improved resilient load adjuster, generally designated 50, according to the present invention, secured to the under side of the semi-trailer frame 38 immediately forward of the axle 46 and wheels 48 which, as usual, are disposed near the rearward end of the chassis 40, leaving the forward end supported only by the tongue 16, coupling 18 and towing vehicle bracket 20. It also includes a flexible load transmitter or cable system, generally designated 52, which flexibly connects the resilient load adjuster 50 ot the towing vehicle or tractor 12, as explained below.

The improved resilient load adjuster 50 of the present invention includes a trapezoidal frame 54 bolted or otherwise secured to the longitudinal trailer frame members 36 in a location beneath the latter. The frame 54 consists of parallel forward and rearward angle members 56 and 58 (FIGURE 2), the forward angle member 56 being shorter than the rearward angle member 58 and their opposite ends being interconnected by forwardly-converging angle members or frame side members 60 having longitudinal slots 61 therein. Mounted on the forward and rearward angle members 56 and 58 and secured to the vertical flanges thereof are bearing blocks 62 which rotatably support the opposite end portions of a screw shaft 64.

Keyed or otherwise drivingly secured to the rearward end of the screwshaft 64 is a worm wheel or worm gear 66. Meshing with the worm gear 66 is a worm 68 mounted on and drivingly connected to the inner end of a load adjusting shaft 70. The shaft 70 is mounted in bearing blocks 72 secured to the rearward frame member 58 and at its outer end 74 is squared or pinned to receive the hub 76 of a detachable operating crank 78. It will be understood that the crank 78 may, if desired, be permanently attached to the shaft 74 either rigidly or pivotally, if it is desired to fold it into a retracted position beneath the trailer body 44.

Mounted on and threadedly engaging the screwshaft 64 is a nut block 80 (FIGURE 2), the opposite ends of which are yoked to receive pivot pins 82. The latter pivotally support the eyes 84 at the inner ends of reversely-bent laminated leaf springs 86 of similar but opposite configuration which collectively resemble an archer's bow with the block 80 resembling the hand grip at the midportion of the bow. The outer portions of the leaf springs 86 pass through and are guided by the longitudinally-slotted frame members 60 and at their outer ends are provided with eyes 88. The leaf springs 86 and nut block 80 collectively form a movable spring structure, generally designated 89. Intermediate the opposite ends 84 and 88 of the leaf springs 86, the latter are engaged by abutment collars 90 on the rearward ends of auxiliary screwshafts 92. The screwshafts 92 are threaded through correspondingly-threaded blocks 94 bolted, welded or otherwise secured to the forward frame member 56 near the outer ends thereof. Mounted on the forward end of each auxiliary screw shaft 92 is a wrench hub or boss 96 of square, hexagonal or other suitable shape for receiving the corresponding but oppositely-shaped end of an adjusting wrench (not shown).

The flexible load transmitter 52 includes rearward hook rods 98 hooked at their rearward ends 100 into the eyes 88 at the outer ends of the leaf spring 86 and at their forward ends provided with eyes 102. Looped through the forward end eyes 102 of the rearward hook rods 98 are the rearward ends of bifurcated rearward load-transmitting cables, generally designated 104, each consisting of outer and inner courses or sections 106 and 108 respectively. The loops 110 and 112 at the rearward and forward ends of the cable sections 106 and 108 are maintained by rearward and forward cable clamps 114 and 116 respectively. The outer cable sections 106 converge from the rearward cable clamp 114 to the forward cable clamp 116 without crossing, whereas the inner cable sections 108 cross one another at approximately the point 118 so that the inner cable section 108 on the right-hand side of the trailer 14 runs from the rearward cable clamp 114 on the right-hand side to a forward cable clamp 116 on the left-hand side thereof and vice versa.

Hooked into the forward cable loops 112 are rearward end hooks 120 of forward hook rods 122, the forward ends of which are provided with eyes 124. Connected to the eyes 124 are the loops 126 at the rearward ends of a forward load-transmitting cable, generally designated 128. The latter has parallel longitudinal courses or sections 130 and a forward transverse connecting course or section 132. The longitudinal courses 130 extend through cable guides 133 and 135 secured to and depending from a cross beam 134 and from a base plate 136 respectively bolted or otherwise secured to the rearward portion of the frame of the towing vehicle 12 (FIGURE 2). The forward load-transmitting cable 128 passes around laterally-spaced pulleys 138 mounted on pivot arms or brackets 140 which are pivotally secured as at 142 to the underside of the frame of the towing vehicle 12.

In the operation of the invention, let it be assumed that the load adjuster 54 has been mounted beneath the frame 38 of the semi-trailer 14, that the pulleys 138 and cable guides 133 and 135 have also been secured to the frame of the towing vehicle 12, and that the flexible load-transmitter cables 104 and 128 have been mounted and interconnected in the manner shown in FIGURE 2. Let it also be assumed that the tractor or other towing vehicle 12 has been coupled to the tongue 16 of the trailer 14 by a suitable coupling 18 and that the trailer body 44 has been fully loaded. Under these conditions, the major part of the weight of the trailer load is imposed upon the tongue 18 and thence transmitted through the coupling 18 to the bracket 20 on the rearward end of the towing vehicle 12. Here it exerts a downward force tending to depress the rearward end of the vehicle 12 around its rear axle 32 and rear wheels 28 as a fulcrum, thereby tending to lift the front wheels 26 off the ground.

To counteract this maldistribution of the semi-trailer load the operator grasps the crank 78 and rotates it in a direction which causes the nut block 80 to move forward along the screwshaft 64, which is rotated through the worm 68 and worm gear 66. The abutment collars 90 on the rearward ends of the auxiliary screwshafts 92 serve as outer fulcrums for the leaf springs 86, the inner ends 84 of which are being moved forward. As a result, the outer ends 88 of the leaf spring 86 tend to move rearwardly but are prevented from doing so freely by the flexible load transmitter or cable system 52. The latter accordingly transmits the thrust imparted by the leaf springs 86 to the rearward hook rods 98 to the forward hook rods 122 and thence to the forward load-transmitting cable 128. This action, exerted upon the pulleys 138 and their pivoted arms 140 at the forward end of the towing vehicle 12 near its front axle 30 tends to pull the forward end of the towing vehicle 12 downward, thrusting the front wheels 26 more firmly against the road and forcing the front axle 30 to assume a more proportionate part of the load of the semi-trailer.

While the vehicle is traveling with the stabilized load distributor 10 rendered operative in the above manner, the downward thrust upon the front wheels 26 improves the traction thereof, increases the effectiveness of the front wheel brakes, and greatly improves the steering qualities of the towing vehicle 12. This in turn increases the safety of operation and prevents both "jackknifing" and "whipsawing."

When the tractor-trailer combination rounds a curve, the forward cable 128 moves around the pulleys 138 to compensate and adjust to the turning of the towing vehicle 12. During travel, moreover, the inner rearward cable sections 108 stabilize the trailer 14 and rescue side sway thereof.

If it is found that the thrust of the leaf springs 86 is inadequate, their thrust may be increased by applying a wrench to the wrench hubs 96 of the auxiliary screwshaft 92 (FIGURE 2), rotating the latter in clockwise directions so as to move the auxiliary screwshafts 92 and their abutment collars 90 rearwardly away from the forward frame cross member 56, thereby forcing the outer portions of the leaf spring 86 to move rearwardly while the inner ends 84 of the leaf springs 86 pivot around the pivot pins 82 on the block nut 80.

While the improved resilient load adjuster 50 of the present invention has been described and illustrated for convenience as mounted on the semi-trailer 14, it will be evident that the arrangement shown herein may be reversed and the load adjuster 50 mounted on the tractor 12, supplying additional pulleys where necessary, in a manner analogous but not equivalent to that shown in United States Patent No. 3,116,974 issued December 31, 1963 for Load-Distributing Device for Tractor-Trailer Combinations.

What is claimed is:

1. A resilient load adjuster for connection to the flexible load-transmitting members of a tractor-trailer vehicle load distributor, said load adjuster comprising
a frame having means thereon for attachment thereof to the vehicle,
a main screwshaft rotatably mounted in said frame,
means for rotating said main screwshaft,
and a movable leaf spring structure having an intermediate threaded portion movably mounted on said frame for displacement relatively thereto and threadedly engaging said main screwshaft for travel therealong in response to rotation thereof,
said leaf spring structure having resilient opposite outer end portions extending outward in opposite directions from said intermediate threaded portion with outer ends disposed remote from said threaded portion and containing means for the connection thereto of the flexible load-transmitting members of the vehicle load distributor.

2. A resilient load adjuster, according to claim 1, wherein said intermediate threaded portion includes a nut member with connections thereon for said resilient opposite outer portions of said leaf spring structure.

3. A resilient load adjuster, according to claim 2, wherein said resilient opposite outer portions of said leaf spring structure include a pair of leaf springs extending outwardly in opposite directions from said nut member and having their inner ends secured to said nut member at said connections.

4. A resilient load adjuster, according to claim 3, wherein said connections comprise pivot elements and wherein said inner ends of said leaf springs are pivotally mounted on said pivot elements.

5. A resilient load adjuster, according to claim 1, wherein a worm gear is drivingly connected to said main screwshaft, and wherein a worm shaft is rotatably mounted on said frame and has a worm meshing with said worm gear.

6. A resilient load adjuster, according to claim 1, wherein said leaf spring structure includes a pair of reversely-curved leaf springs extending outwardly in opposite directions from said threaded portion.

7. A resilient load adjuster, according to claim 1, wherein said frame is provided with elongated guideways and wherein the outer portions of said leaf spring structure slidably engage said guideways.

8. A resilient load adjuster, according to claim 1, wherein said frame is provided with two internally-threaded auxiliary portions disposed with their axes in spaced parallel relationship with the axis of said main screwshaft, and wherein two abutment screwshafts are rotatably mounted in said auxiliary threaded portions with ends disposed in abutting engagement with adjacent outer portions of said movable spring structure.

9. A resilient load adjuster, according to claim 8, wherein said frame is provided with elongated guideways and wherein said outer portions of said movable spring structure slidably engage said guideways.

References Cited by the Examiner

UNITED STATES PATENTS

| 2,715,034 | 8/1955 | Cornwall | 280—406 |
| 2,756,072 | 7/1956 | Koontz | 280—405 |
| 2,872,212 | 2/1959 | Hume | 280—406 |
| 3,116,074 | 12/1963 | Koontz | 280—405 |

LEO FRIAGLIA, *Primary Examiner.*